(12) United States Patent
Suzuki et al.

(10) Patent No.: US 12,194,410 B2
(45) Date of Patent: Jan. 14, 2025

(54) AMINE-CONTAINING WATER CONCENTRATION SYSTEM AND APPARATUS, AND CARBON DIOXIDE RECOVERY SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Akiko Suzuki, Ota (JP); Toshihiro Imada, Kawasaki (JP); Kenji Sano, Inagi (JP); Yusuke Handa, Kita (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 498 days.

(21) Appl. No.: 17/447,470

(22) Filed: Sep. 13, 2021

(65) Prior Publication Data
US 2022/0305432 A1 Sep. 29, 2022

(30) Foreign Application Priority Data
Mar. 23, 2021 (JP) .................................. 2021-048952

(51) Int. Cl.
*B01D 53/14* (2006.01)
*B01D 61/00* (2006.01)
(Continued)

(52) U.S. Cl.
CPC ..... *B01D 53/1425* (2013.01); *B01D 53/1475* (2013.01); *B01D 53/1493* (2013.01);
(Continued)

(58) Field of Classification Search
CPC .......... C02F 1/004; C02F 1/411; C02F 1/445; C02F 1/447; C02F 1/66; C02F 1/68;
(Continued)

(56) References Cited

U.S. PATENT DOCUMENTS

| 5,522,995 A * | 6/1996 | Cockrem | B01D 61/025 |
| | | | 210/259 |
| 8,216,474 B2 * | 7/2012 | Cath | B01D 61/002 |
| | | | 210/652 |

(Continued)

FOREIGN PATENT DOCUMENTS

| CN | 102743953 A | 10/2012 |
| CN | 103228340 A | 7/2013 |

(Continued)

OTHER PUBLICATIONS

Combined Chinese Office Action and Search Report issued Mar. 1, 2024, in corresponding Chinese Patent Application No. 202210209100.X (with English Translation) citing document 1, 2, 11-17 therein, 16 pages.

(Continued)

*Primary Examiner* — Christopher P Jones
*Assistant Examiner* — Sonji Turner
(74) *Attorney, Agent, or Firm* — Oblon, McClelland, Maier & Neustadt, L.L.P.

(57) ABSTRACT

According to one embodiment, an amine-containing water concentration system includes an osmotic pressure generator and a carbon dioxide introducing unit. The osmotic pressure generator includes a treatment vessel, a first chamber to which the water to be treated is supplied, a second chamber capable of storing a working medium, and a semipermeable membrane that partitions the first chamber and the second chamber, which are located in the treatment vessel. The (Continued)

carbon dioxide introducing unit is capable of introducing carbon dioxide into the water to be treated.

13 Claims, 4 Drawing Sheets

(51) Int. Cl.
| | | |
|---|---|---|
| *C02F 1/00* | (2023.01) | |
| *C02F 1/44* | (2023.01) | |
| *C02F 1/68* | (2023.01) | |
| *C02F 101/38* | (2006.01) | |
| *C02F 103/18* | (2006.01) | |

(52) U.S. Cl.
CPC ............ *B01D 61/005* (2013.01); *C02F 1/004* (2013.01); *C02F 1/445* (2013.01); *C02F 1/68* (2013.01); *B01D 2252/204* (2013.01); *B01D 2257/504* (2013.01); *B01D 2258/0283* (2013.01); *B01D 2311/04* (2013.01); *B01D 2311/12* (2013.01); *B01D 2311/14* (2013.01); *B01D 2311/2626* (2013.01); *B01D 2311/263* (2013.01); *B01D 2311/2649* (2013.01); *B01D 2311/2661* (2013.01); *B01D 2313/243* (2013.01); *C02F 2101/38* (2013.01); *C02F 2103/18* (2013.01); *C02F 2209/03* (2013.01)

(58) Field of Classification Search
CPC .............. C02F 2101/16; C02F 2101/38; C02F 2103/18; C02F 2209/03; C02F 2303/16; B01D 53/1425; B01D 53/1475; B01D 53/1493; B01D 53/18; B01D 61/005; B01D 2252/204; B01D 2257/504; B01D 2258/0283; B01D 2311/04; B01D 2311/12; B01D 2311/14; B01D 2311/2626; B01D 2311/263; B01D 2311/2649; B01D 2311/2661; B01D 2313/243; B01D 61/0023; B01D 61/002; B01D 61/04
See application file for complete search history.

(56) References Cited

U.S. PATENT DOCUMENTS

| | | | | |
|---|---|---|---|---|
| 9,630,861 | B2* | 4/2017 | Ikeda .................... | C02F 1/445 |
| 10,087,089 | B2* | 10/2018 | Ikeda ................ | B01D 61/0022 |
| 10,087,090 | B2* | 10/2018 | Ikeda ................ | B01D 61/002 |
| 10,363,336 | B2* | 7/2019 | Wilson ............... | B01D 61/0022 |
| 11,306,008 | B2* | 4/2022 | Suzuki ............... | B01D 61/0021 |
| 2010/0006495 | A1 | 1/2010 | Buschmann | |
| 2011/0100218 | A1 | 5/2011 | Wolfe | |
| 2012/0174639 | A1 | 7/2012 | Herron | |
| 2012/0263627 | A1* | 10/2012 | Fujita .................... | B01D 53/62 |
| | | | | 422/119 |
| 2012/0267306 | A1 | 10/2012 | McGinnis et al. | |
| 2012/0273417 | A1* | 11/2012 | McGinnis .............. | B01D 61/36 |
| | | | | 210/637 |
| 2013/0333568 | A1 | 12/2013 | Bockman et al. | |
| 2014/0076810 | A1* | 3/2014 | Jessop .................. | B01D 61/005 |
| | | | | 210/207 |
| 2014/0319056 | A1* | 10/2014 | Fuchigami ......... | B01D 61/0022 |
| | | | | 210/648 |
| 2014/0335003 | A1 | 11/2014 | Kato et al. | |
| 2015/0273396 | A1* | 10/2015 | Hancock ................ | B01D 61/58 |
| | | | | 210/243 |
| 2016/0206991 | A1* | 7/2016 | Hafner ................. | B01D 15/361 |
| 2016/0236951 | A1 | 8/2016 | Ikeda et al. | |
| 2018/0078901 | A1 | 3/2018 | Iyer | |
| 2018/0229184 | A1 | 9/2018 | Resendes et al. | |
| 2019/0224614 | A1 | 7/2019 | Feron et al. | |
| 2021/0292194 | A1 | 9/2021 | Suzuki et al. | |

FOREIGN PATENT DOCUMENTS

| | | | | |
|---|---|---|---|---|
| CN | | 104138709 A | | 11/2014 |
| CN | | 110548415 A | | 12/2019 |
| EP | | 2 514 509 A1 | | 10/2012 |
| EP | | 3 670 457 A1 | | 6/2020 |
| JP | | 2-2827 A | | 1/1990 |
| JP | | 5-309237 A | | 11/1993 |
| JP | | 2012-196630 A | | 10/2012 |
| JP | | 2012-223681 A | | 11/2012 |
| JP | | 2014-100623 A | | 6/2014 |
| JP | | 5703106 B2 | | 4/2015 |
| JP | | 2018-202274 A | | 12/2018 |
| JP | | 6649310 B2 | | 2/2020 |
| JP | | 2021-146275 A | | 9/2021 |
| WO | WO 2013/091129 A1 | | 6/2013 | |
| WO | WO 2013/128407 A1 | | 9/2013 | |
| WO | WO 2018/124103 A1 | | 7/2018 | |
| WO | WO-2018173331 A1 * | | 9/2018 | ........... B01D 61/005 |

OTHER PUBLICATIONS

Decision to Grant a Patent issued Apr. 16, 2024, in corresponding Japanese Patent Application No. 2021-048952 (with English Translation), citing documents 18, 19 therein, 5 pages.

United Kingdom Office Action issued Jun. 5, 2024 in United Kingdom Patent Application No. GB2203358.3, citing references 1-6 therein, 7 pages.

Liu Dexin (Ed.), "Oilfield Wastewater Treatment", China University of Petroleum Press, Apr. 2015, p. 160 (with English machine translation).

Office Action issued on Aug. 1, 2024, in corresponding CN Application No. 202210209100.X, (8 pages).

* cited by examiner

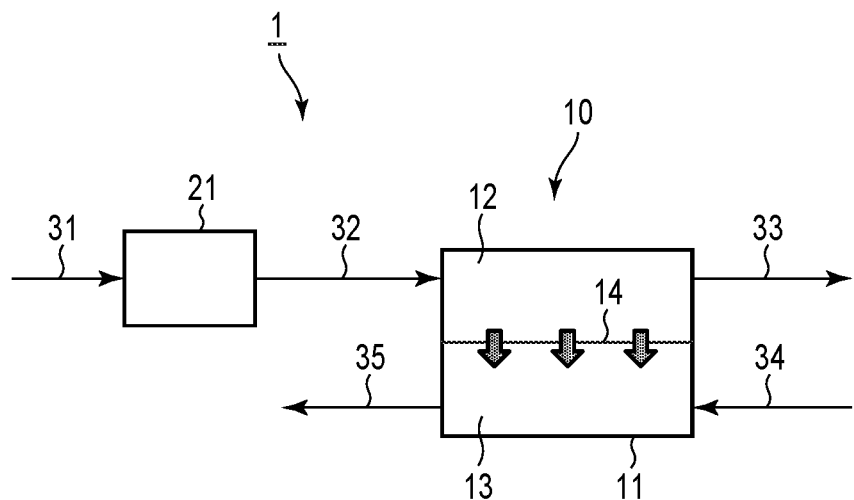
F I G. 1
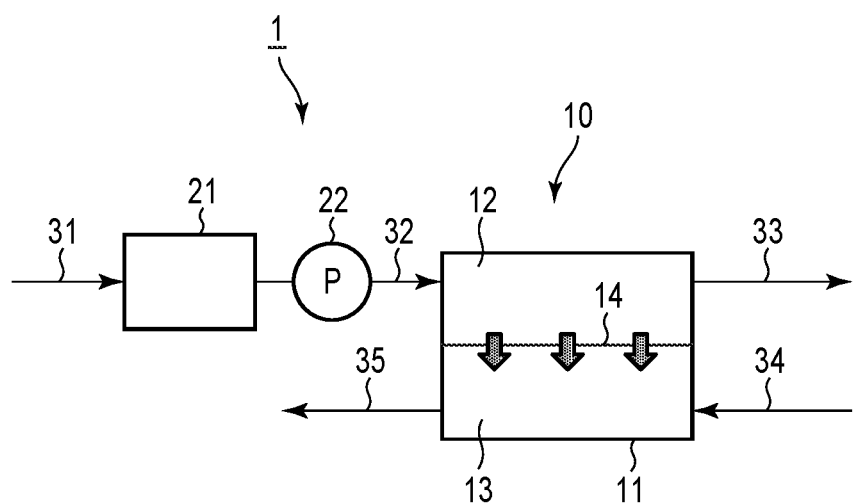
F I G. 2

AMINE-CONTAINING WATER CONCENTRATION SYSTEM AND APPARATUS, AND CARBON DIOXIDE RECOVERY SYSTEM

CROSS-REFERENCE TO RELATED APPLICATIONS

This application is based upon and claims the benefit of priority from Japanese Patent Application No. 2021-048952, filed Mar. 23, 2021, the entire contents of which are incorporated herein by reference.

FIELD

Embodiments described herein relate generally to a system and an apparatus configured to concentrate amine-containing water to be treated, and a carbon dioxide recovery system.

BACKGROUND

In recent years, a carbon dioxide component in an exhaust gas (combustion exhaust gas) emitted from a combustion system of a thermal power plant or the like is considered to be a cause of global warming, and there are demands for the reduction of an emission amount of carbon dioxide component and for the recovery of carbon dioxide component. As a wet recovery process by which carbon dioxide component in the exhaust gas is wet-recovered, a chemical absorption method using an absorbent solution similar to an alkanolamine aqueous solution is widely known.

A carbon dioxide recovery system that employs such a chemical absorption method generally includes a carbon dioxide absorption section and a regeneration section. In the absorption section, the exhaust gas is brought into contact with the absorbent solution thereby carbon dioxide in the exhaust gas is dissolved into the absorbent solution, and thus carbon dioxide is removed from the exhaust gas. The absorbent solution that has absorbed carbon dioxide (a solution rich in carbon dioxide) is delivered from the absorption section to the regeneration section, and the solution rich in carbon dioxide is heated in the regeneration section thereby a high concentration of carbon dioxide is released. The absorbent solution that has released carbon dioxide (a lean solution) is, as a regenerated absorbent solution capable of absorbing carbon dioxide, delivered from the regeneration section to the absorption section. In the carbon dioxide recovery system, as described above, the absorbent solution is circulated between the absorption section and the regeneration section, whereby carbon dioxide in the exhaust gas is removed and the absorbent solution is repeatedly reused.

In the carbon dioxide recovery system, when the exhaust gas and the absorbent solution come into contact with each other in the absorption section, while carbon dioxide in the exhaust gas is absorbed by the absorbent solution, a part of the absorbent solution is entrained in the exhaust gas and is emitted from the absorption section. In order to suppress the emission of the absorbent solution component entrained in the exhaust gas into the atmosphere, an exhaust gas cleaning section (an emission control section) is disposed at the subsequent stage of the absorption section. In the exhaust gas cleaning section, the exhaust gas is cleaned with washing water so that the leakage of the absorbent solution component from the carbon dioxide recovery system to the outside is suppressed. The washing water, which has captured the absorbent solution component from the exhaust gas, is reused, or is discarded as drainage.

It is known that a highly concentrated carbon dioxide gas released from the regeneration section also entrains the absorbent solution component. For this reason, the carbon dioxide gas is cooled, thereby water vapor released together with the carbon dioxide gas is condensed, and the condensed water containing the absorbent solution component is discharged as drainage.

As described above, in the exhaust gas cleaning section and the regeneration section, the washing water drainage and the condensed water drainage are generated.

BRIEF DESCRIPTION OF THE DRAWINGS

FIG. 1 is a schematic view showing an amine-containing water concentration system of a first embodiment.

FIG. 2 is a schematic diagram showing an amine-containing water concentration system of a second embodiment.

DETAILED DESCRIPTION

Figure 3:
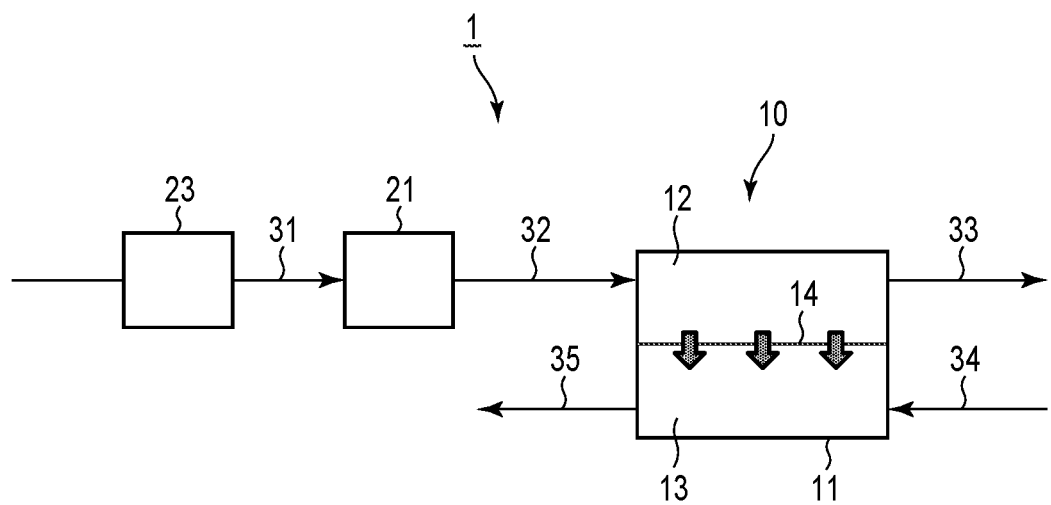
FIG. 3 is a schematic diagram showing an amine-containing water concentration system of a third embodiment.

In general, according to one embodiment, there is provided an amine-containing concentration system, which is a system that concentrates water to be treated containing an amine, including: an osmotic pressure generator including a treatment vessel and a semipermeable membrane that is disposed in the treatment vessel and that partitions a first chamber to which the water to be treated is supplied and a second chamber to which a forward osmotic pressure-inducing working medium is supplied; and a carbon dioxide introducing unit configured to introduce carbon dioxide into the water to be treated in the first chamber.

Hereinafter, the present embodiments will be described with reference to the drawings. Unless otherwise specified, pH values and values obtained by other measurements are the values measured at atmospheric pressure and at 25° C.

First Embodiment

FIG. 1 is a schematic view showing an amine-containing water concentration system according to a first embodiment.

The amine-containing water concentration system 1 according to the first embodiment includes an osmotic pressure generator 10. The osmotic pressure generator 10 includes a treatment vessel 11, a first chamber 12 and a second chamber 13 that are located in the treatment vessel 11, and a semipermeable membrane 14 that partitions the first chamber 12 and the second chamber 13.

The first chamber 12 of the treatment vessel 11 is capable of storing water to be treated and is supplied with water to be treated. The second chamber 13 of the treatment vessel 11 is capable of storing a working medium.

A carbon dioxide introducing unit 21 is disposed in the pre-stage of the osmotic pressure generator 10. A flow path 31 configured to introduce amine-containing water to be treated is connected to the carbon dioxide introducing unit 21. The carbon dioxide introducing unit 21 is connected by a flow path 32 to the treatment vessel 11 at the position that the first chamber 12 is located on. A flow path 33 configured to discharge a concentrated water generated in the first chamber 12 is connected to the treatment vessel 11 at the position that the first chamber 12 is located on. The generated concentrated water contains an amine compound. In the present specification, an amine compound is simply referred to as an amine in some cases. A flow path 34 configured to deliver the working medium into the second chamber 13 is connected to the treatment vessel 11 at the position that the second chamber 13 is located on. A flow path 35 configured to discharge the working medium in the second chamber 13 is connected to the treatment vessel 11 at the position that the second chamber 13 is located on.

The semipermeable membrane 14 is a forward osmosis membrane or a reverse osmosis membrane. The semipermeable membrane 14 may be a flat membrane, a hollow fiber, or a tubular type, for example. The shape of the semipermeable membrane 14 is not particularly limited, and examples thereof include a spiral type, a plate and frame type, a straight type, and a cross wind type. A cross section of the forward osmosis membrane used for the semipermeable membrane 14 has a unification structure of a support layer and an active layer, and allows water to selectively permeate therethrough. Its material is not particularly limited, but is preferably formed of, for example, cellulose acetate, polyamide, polyethyleneimine, polysulfone, polybenzimidazole, or the like.

The reverse osmosis membrane used for the semipermeable membrane 14 has a support layer and an active layer, and allows water to selectively permeate therethrough. Its material is not particularly limited, but is preferably formed of, for example, polyamide, polyvinyl alcohol, polysulfone, polyolefin, polyvinylidene fluoride, or the like.

The carbon dioxide introducing unit 21 may have any form as long as it has a function of dissolving carbon dioxide in the water to be treated. That is, "the unit is capable of introducing carbon dioxide" means that the unit has a function allowing carbon dioxide to be dissolved or contained in the water to be treated. An introducing of carbon dioxide means, for example, injecting water to be treated into a tank filled with a gas containing carbon dioxide so that carbon dioxide and the water to be treated are brought into contact with each other, bubbling carbon dioxide into the water to be treated, or pressurizing carbon dioxide so as to be dissolved into the water to be treated. Examples of the carbon dioxide introducing unit 21 include a tank filled with a gas containing carbon dioxide, an apparatus that bubbles a gas containing carbon dioxide, and an apparatus that pressurizes carbon dioxide so as to be dissolved into water to be treated. In view of treatment speed, a gas introduced from the carbon dioxide introducing unit 21 has preferably a higher volume concentration of carbon dioxide, the volume concentration of carbon dioxide is preferably from 5% to 100%, and more preferably from 10% to 100%.

In FIG. 1, the carbon dioxide introducing unit 21 and the first chamber 12 is connected by the flow path 32, but carbon dioxide may be directly blown into the first chamber or the like, thereby allowing carbon dioxide to be dissolved into the water to be treated. In this case, the flow path 32 is omitted, and the carbon dioxide introducing unit is unified with the first chamber 12.

There will be described an operation how the amine-containing water to be treated is concentrated by the amine-containing water concentration system according to the first embodiment.

The water to be treated is introduced through the flow path 31 into the carbon dioxide introducing unit 21 where carbon dioxide is dissolved into the water to be treated. The amine-containing water to be treated in which carbon dioxide is dissolved is supplied through the flow path 32 into the first chamber 12 of the osmotic pressure generator 10 partitioned by the semipermeable membrane 14. About that time when the water to be treated is supplied to the first chamber 12, a working medium is supplied through the flow path 34 to the second chamber 13. At this time, the working medium supplied to the second chamber 13 has a higher ion molar concentration than the concentration of amine contained in the water to be treated supplied into the first chamber 12. For this reason, an osmotic pressure difference occurs between the water to be treated in the first chamber 12 and the working medium in the second chamber 13, and thus water contained in the water to be treated passes through the semipermeable membrane 14 and moves into the working medium in the second chamber 13. The water to be treated in the first chamber 12 is concentrated by such movement of the permeated water, which is the water that has passed through the semipermeable membrane 14 from the water to be treated. It is also possible that the flow path 33 and the flow path 32 are connected so that the water to be treated is circulated in the first chamber 12, thereby the water to be treated can be more highly concentrated. On the other hand, the working medium in the second chamber 13 is diluted by the permeated water moved thereinto, and then discharged to the outside through the flow path 35. It is also possible an operation in which the working medium is circulated in the second chamber 13 by connecting the flow path 35 and the flow path 34.

The pH of the amine-containing water to be treated, in which carbon dioxide is dissolved by the carbon dioxide introducing unit 21, is preferably adjusted to a range of 6 to 9. In view of durability of the semipermeable membrane 14, the pH of the water to be treated is more preferably adjusted to 7 to 8.

The working medium is capable of inducing a forward osmotic pressure in the second chamber 13. For example, there can be used a medium containing at least a compound selected from an inorganic salt, an amine compound, a saccharide, a polarity inversion compound, and a component having a lower critical solution temperature (LCST). These compounds may be small molecules or macromolecules. As a working medium, there may be used a mixed solution of various salts such as seawater. The working medium may be in a form of an aqueous solution, or may be in a form of nano-sized granules or gel-like body. When seawater is used, it may be directly supplied from the sea to the second chamber.

According to the first embodiment, carbon dioxide is introduced into the amine-containing water to be treated by the carbon dioxide introducing unit 21. A part of amine compounds in the water to be treated is a useful amine compound that reacts with the introduced carbon dioxide. It is known that, in general, under conditions of temperature of 25° C., of atmospheric pressure and of an acid dissociation constant pKa=7 or more, an amine compound reacted with carbon dioxide becomes a cation having bicarbonate as its counterion, or becomes a carbamate formed by addition of carbon dioxide. That is, among amine compounds in the water to be treated, an amine compound reacted with carbon dioxide is ionized and becomes charged. On the other hand, among amine compounds in the water to be treated, an amine compound that does not react with carbon dioxide is an unwanted amine compound. This unwanted amine compound is less likely to be charged under the above-described conditions.

When the water to be treated which contains such a useful amine compound and an unwanted amine compound, is applied to the amine-containing water concentration system according to the first embodiment, the useful amine compound reacts with the carbon dioxide introduced through the carbon dioxide introducing unit 21 and becomes charged, while the unwanted amine compound does not react with the introduced carbon dioxide and is less likely to be charged. In a case where water to be treated containing a useful amine compound and an unwanted amine compound, into which carbon dioxide is introduced, is delivered to the first chamber 12 of the osmotic pressure generator 10, and at the same time a working medium is delivered to the second chamber 13, a repulsive force is generated against the semipermeable membrane 14 since the useful amine compound is charged, and thus the useful amine compound is less likely to pass through the semipermeable membrane 14, and is likely to remain in the water to be treated. The unwanted amine compound contained in the water to be treated is less likely to be charged and likely to pass through the semipermeable membrane 14, and thus likely to move into the working medium in the second chamber 13 after passing through the semipermeable membrane 14.

As a result, the contents of the water and the unwanted amine compound in the water to be treated discharged from the first chamber 12 of the osmotic pressure generator 10 are smaller than those in the water to be treated before being introduced into the first chamber 12, while the content of the useful amine compound is maintained. That is, the water to be treated in the first chamber 12 can be discharged at a concentrated condition in which the content of the useful amine compound is relatively increased.

Examples of unwanted amine compounds, which do not react with carbon dioxide, include 1-nitrosopiperidine, 1,4-diformylpiperazine, bicine, and 2,5-pyrrolidinedione. On the other hand, examples of useful amine compounds, which react with carbon dioxide, include alkanolamines, cyclic amines, and diamines.

As described above, the amine-containing water concentration system 1 according to the first embodiment utilizes the property of the semipermeable membrane 14, of differentiating between a charged compound and an uncharged compound in the membrane permeability, so that, among amine compounds contained in water to be treated, a useful amine compound, which reacts with carbon dioxide, can be selectively concentrated.

In the amine-containing water concentration system 1 according to the first embodiment, the osmotic pressure generator 10 including the forward osmosis membrane as its semipermeable membrane 14 can be operated at a lower pressure. Even under such condition, highly concentrating the amine-containing water to be treated can be achieved because of the properties of the semipermeable membrane 14 described above and an osmotic pressure induced to the working medium. In the forward osmosis membrane method operated at a lower pressure, there can be used a forward osmosis membrane having a structure of a thinner support layer and a more loosen active layer than those of a reverse osmosis membrane. The forward osmosis phenomenon occurs also in the reverse osmosis membrane, however, when operated at the same flow rate, the forward osmosis membrane can more efficiently recover the amine than the reverse osmosis membrane.

The inventors have found that, when a semipermeable membrane is used, there is a difference between an amine that absorbs carbon dioxide and an amine that does not absorb carbon dioxide in their membrane permeation rates. Therefore, an amine that absorbs carbon dioxide can be separated from an amine that does not absorb carbon dioxide with use of a semipermeable membrane, and there can be obtained a useful amine-containing concentrated water that exhibits an osmotic pressure of 800 mOsm or more at 25° C.

Furthermore, a large amount of the useful amine compound capable of reacting with carbon dioxide, i.e., an amine compound capable of capturing carbon dioxide is enriched in the concentrated water obtained from the amine-containing water concentration system 1 according to the first embodiment, hence the concentrated water can be reused as an absorbent solution in the carbon dioxide recovery systems according to a fifth and sixth embodiments described later.

The amine-containing water concentration system 1 according to the first embodiment may be configured to include a plurality of osmotic pressure generators 10. As an arrangement form of the osmotic pressure generators 10, there can be employed a series type, a parallel type, or a mixed type thereof.

In the first embodiment, the second chamber 13 is supplied with the working medium, but is not limited to this, the second chamber should only be capable of storing the working medium. That is, the second chamber is not required to be connected to the flow path 34, which delivers the working medium to the second chamber. The second chamber may or may not be connected to a working medium regeneration apparatus described later.

The amine-containing water concentration system according to the first embodiment described above may be configured as an apparatus. That is, the amine-containing water concentrating apparatus may include: an osmotic pressure generator including a treatment vessel, a first chamber to which water to be treated is supplied, a second chamber capable of storing a working medium, and a semipermeable membrane that partitions the first chamber and the second chamber, which are located in the treatment vessel; and a carbon dioxide introducing unit capable of introducing carbon dioxide into the water to be treated.

Second Embodiment

FIG. 2 is a schematic view showing an amine-containing water concentration system 1 of a second embodiment. In FIG. 2, members similar to those in FIG. 1 described in the first embodiment are denoted by the same reference numerals, and description thereof is omitted. In the amine-containing water concentration system 1 according to the second embodiment, a pump 22 is interposed in a flow path 32 connecting a carbon dioxide introducing unit 21 and a first chamber 12. The pump 22 has a function of boosting the water to be treated, in which carbon dioxide is dissolved by the carbon dioxide introducing unit 21, at the time when the water to be treated is delivered to first chamber 12 of an osmotic pressure generator 10 through the flow path 32.

The pressure of the water to be treated boosted by the pump 22 is preferably set to be relatively low. As such, the maximum discharge pressure is preferably set to 1 MPa or less, for example.

According to the second embodiment, the amine-containing water to be treated, in which carbon dioxide is introduced, is boosted by the pump 22 and introduced into the first chamber 12, so that the water contained in the water to be treated in the first chamber 12 is allowed to more efficiently pass through a semipermeable membrane 14 into a second chamber 13.

Third Embodiment

FIG. 3 is a schematic view showing an amine-containing water concentration system 1 of a third embodiment. In FIG. 3, members similar to those in FIG. 1 described in the first embodiment are denoted by the same reference numerals, and description thereof is omitted.

In the amine-containing water concentration system 1 according to the third embodiment, a filtration section 23 that filtrates a solid in water to be treated is interposed in a first flow path 31.

According to the amine-containing water concentration system 1 according to the third embodiment, a solid contained in the water to be treated can be removed at the filtration section 23, and water to be treated that has become cleaner can be delivered to a first chamber 12 of an osmotic pressure generator 10, so that the membrane maintenance frequency can be reduced.

The third embodiment may include a pump as described in the second embodiment.

Fourth Embodiment

Figure 4:
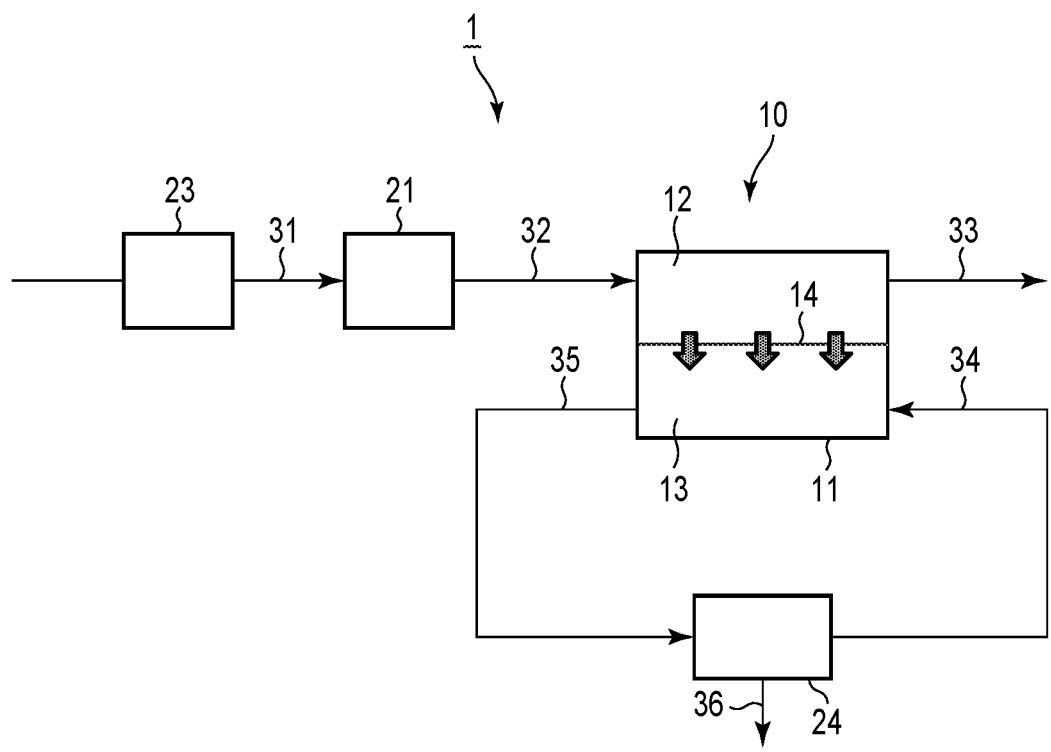
FIG. 4 is a schematic diagram showing an amine-containing water concentration system of a fourth embodiment.

FIG. 4 is a schematic diagram showing an amine-containing water concentration system 1 according to a fourth embodiment. In FIG. 4, members similar to those in FIG. 1 described in the first embodiment are denoted by the same reference numerals, and description thereof is omitted.

The amine-containing water concentration system 1 according to the fourth embodiment further includes a working medium regeneration apparatus 24. The working medium regeneration apparatus 24 is connected by a flow path 34 to a treatment vessel 11 at the position that a second chamber 13 of an osmotic pressure generator 10 is located on. The treatment vessel 11 at the position that the second chamber 13 is located on, is connected by a flow path 35 to the working medium regeneration apparatus 24. That is, there is formed a working medium circulation system in which the working medium flows through the working medium regeneration apparatus 24, the flow path 34, the second chamber 13, and the flow path 35, and then returns to the working medium regeneration apparatus 24 again.

In the working medium regeneration apparatus 24, there is circulated the working medium, which is diluted by the movement of the water passed through a semipermeable membrane 14 from the water to be treated in a first chamber 12, and there can be regenerated a highly concentrated working medium by separating the water contained in the working medium. In a case of using a working medium having a stimulus responsiveness such as temperature responsiveness, magnetic field responsiveness, electric field responsiveness, pH responsiveness, volatility, and $CO_2$ responsiveness, the working medium regeneration apparatus 24 may be configured to regenerate the working medium by applying a stimulus to the diluted working medium so that water contained in the working medium is separated and removed through a sixth flow path 36. The working medium regeneration apparatus 24 may be configured to remove the water contained in the diluted working medium with use of a process such as membrane distillation, for example, and to regenerate the diluted working medium into a highly concentrated working medium. The water discharged from the flow path 36 may be returned to a water supply tank or the like in a Carbon Capture Utility System (CCUS) plant so as to be reused.

According to the fourth embodiment like this, in the working medium circulation system, the working medium is supplied from the working medium regeneration apparatus 24 to the second chamber 13 through the fourth flow path 34, thereby the water contained in the water to be treated in the first chamber 12 passes through the semipermeable membrane 14, and the working medium diluted with the water is delivered through the fifth flow path 35 to the working medium regeneration apparatus 24, in which the water is removed and thereby a highly concentrated working medium is regenerated. The regenerated working medium is circulated to the second chamber 13 through the fourth flow path 34 and is reused.

Hence, there can be realized an amine-containing water concentration system 1 in which cost reduction is achieved by reduction of the usage amount and the waste amount of the working medium.

In the fourth embodiment, there may be interposed, for example, in the sixth flow path 36, a purification apparatus (not illustrated) configured to remove a small amount of working medium mixed in a permeated water recovered from the sixth flow path 36. In this way, the purity of the permeated water can be increased. The removed working medium is preferably returned to the second chamber 13 or the flow path thereof. The working medium gradually decreases in the process of circulation due to mixing into the permeated water, and thus the decreased amount must be compensated, hence the working medium is preferably recovered and repeatedly used. The purification apparatus preferably has a configuration appropriate to the properties of the working medium. The recovery rate of the working medium can be enhanced by introducing this purification apparatus.

The fourth embodiment may include a pump as described in the second embodiment and/or a filtration section as described in the third embodiment.

Fifth Embodiment

A carbon dioxide recovery system according to a fifth embodiment will be described in detail with reference to FIG. 5.

Figure 5:
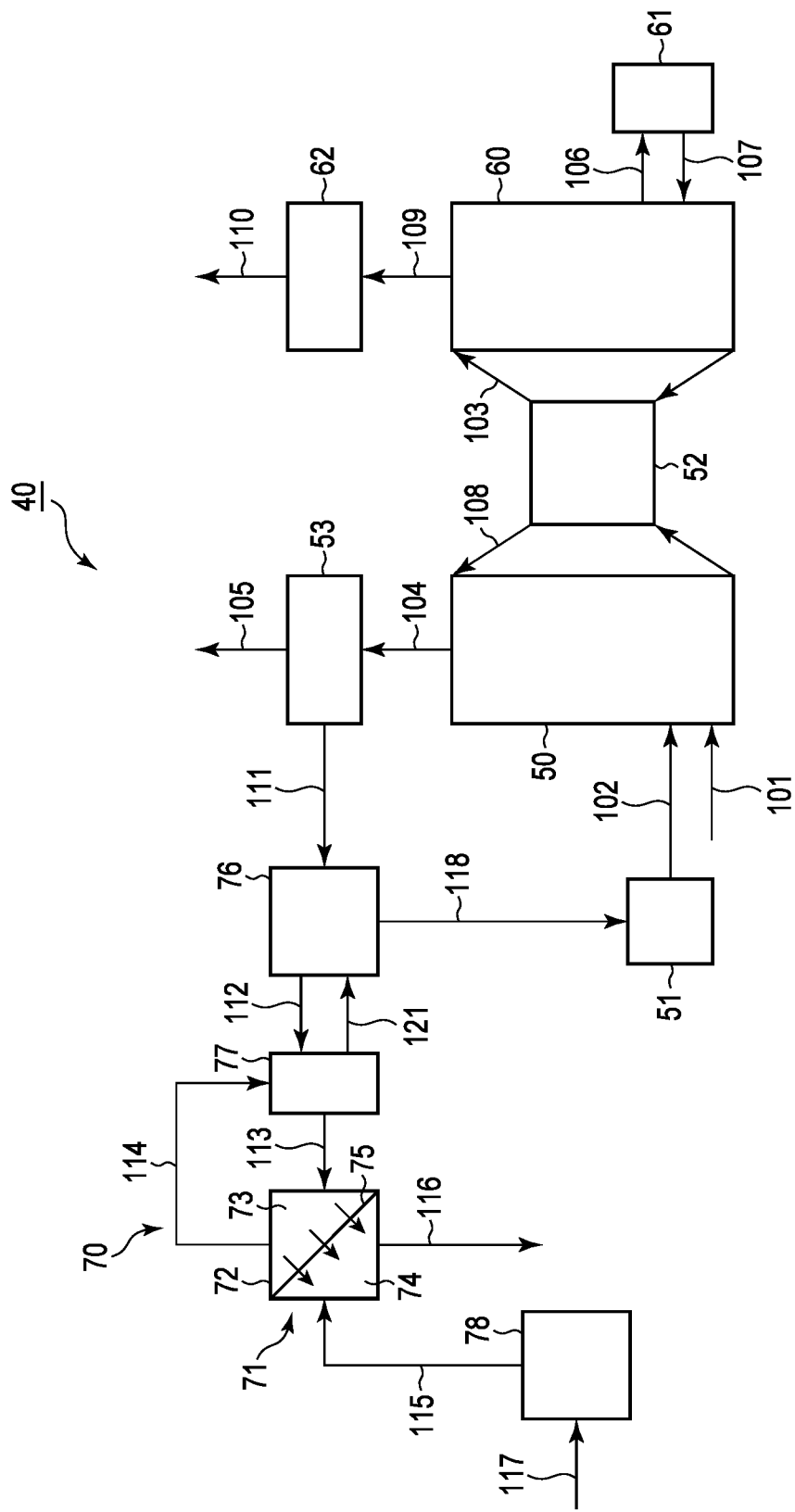
FIG. 5 is a schematic diagram showing a carbon dioxide recovery system of a fifth embodiment.

FIG. 5 is a schematic diagram showing a carbon dioxide recovery system according to the fifth embodiment. The carbon dioxide recovery system 40 includes an absorption tower 50 and a regeneration tower 60 each equipped with a liquid distributor (not illustrated) in its upper portion, and an amine-containing water concentration system 70.

The exhaust gas introducing flow path 101 is connected to the vicinity of a lower portion of the absorption tower 50. The absorbent solution supply tank 51 is connected by a flow path 102 to a portion higher than the connecting portion of the exhaust gas introducing flow path 101 in the vicinity of the lower portion of the absorption tower 50, and the absorbent solution in the absorbent solution supply tank 51 is delivered to the absorption tower 50 through the flow path 102. A flow path 103 has one end connected to the lower portion of the absorption tower 50 and the other end connected to a second liquid distributor (not illustrated) of the regeneration tower 60. A carbon dioxide-rich solution accumulated in the lower portion of the absorption tower 50 is delivered to the upper portion of the regeneration tower 60 through the flow path 103. A heat exchanger 52 is interposed in the flow path 103.

The top of the absorption tower 50 is connected to an emission control section 53 by a flow path 104, and a carbon dioxide-desorbed gas entraining the absorbent solution in the absorption tower 50 is delivered to the emission control section 53 through the flow path 104. In the emission control section 53, the carbon dioxide-desorbed gas is cleaned with washing water in order to prevent the absorbent solution component (amine) entrained in the carbon dioxide-desorbed gas from being emitted into the environment. For this reason, an amine-containing washing water (water to be treated described later) is accumulated in the emission control section 53 for a temporary period of time. A treated gas in the emission control section 53 is discharged from a flow path 105 to the outside of the system.

The regeneration tower 60 is heated by a reboiler 61, and carbon dioxide is released from the carbon dioxide-rich solution delivered from the flow path 103. A flow path 108 has one end connected to the lower portion of the regeneration tower 60 and the other end connected to a liquid distributor (not illustrated) of the absorption tower 50. A carbon dioxide-lean solution accumulated in the lower portion of the regeneration tower 60 is delivered to the liquid distributor (not illustrated) in the upper portion of the absorption tower 50 through the flow path 108. The flow path 108 and the flow path 103 passing through the heat exchanger 52 cross each other.

The top of the regeneration tower 60 is connected to a gas purification section 62 by a flow path 109. The desorbed carbon dioxide in the regeneration tower 60 is delivered through the flow path 109 to the gas purification section 62, and therein the desorbed carbon dioxide is purified. The purified carbon dioxide is recovered to a carbon dioxide recovery section (not illustrated) through a flow path 110.

The amine-containing water concentration system 70 includes an osmotic pressure generator 71. The osmotic pressure generator 71 includes: a first chamber 73, a second chamber 74 capable of storing a working medium that induces a forward osmotic pressure, and a semipermeable membrane 75 that partitions the first chamber and the second chamber, which are disposed in the treatment vessel 72.

The emission control section 53 is connected to a washing water accumulation tank 76 by a flow path 111, and an amine-containing washing water (water to be treated) in the emission control section 53 is delivered to the washing water accumulation tank 76 through the flow path 111. The washing water accumulation tank 76 is connected to a water to be treated tank 77 by a flow path 112, and is connected to the absorbent solution supply tank 51 by a flow path 118. The water to be treated tank 77 is connected by a flow path 113 to the treatment vessel 72 at the position that the first chamber 73 of the osmotic pressure generator 71 is located on. The water to be treated tank 77 includes a carbon dioxide introducing unit. That is, while washing water (water to be treated) in the washing water accumulation tank 76 is, as an absorbent solution, supplied to the absorbent solution supply tank 51, a part of the washing water is delivered to the first chamber 73 after carbon dioxide has been introduced thereinto by a carbon dioxide introducing unit in the water to be treated tank 77. A carbon dioxide introducing unit similarly to that described in the first embodiment can be used for the carbon dioxide introducing unit of the water to be treated tank 77. The treatment vessel 72 is connected to the water to be treated tank 77 by a flow path 114 at the position of the first chamber 73 is located on. The concentrated water in the first chamber 73, after water permeation through the semipermeable membrane 75 to the second chamber 74, is returned (circulated) to the water to be treated tank 77 through the flow path 114, and returned to the washing water accumulation tank 76 through a flow path 121.

A working medium storage tank 78 storing a highly concentrated working medium (e.g. seawater) is connected by a flow path 115 to the treatment vessel 72 at the position that the second chamber 74 is located on, and the working medium in the working medium storage tank 78 is delivered through the flow path 115 to the second chamber 74. The treatment vessel 72 is connected to a flow path 116 at the position that the second chamber 74 is located on, and the working medium, which is diluted by the permeation of the water, in the second chamber 74 is discharged, i.e., flows directly from the flow path 116 to the outside of the system. The highly concentrated working medium is supplied from a flow path 117 to the working medium storage tank 78.

Next, an operation procedure of the carbon dioxide recovery system according to the fifth embodiment will be described.

An exhaust gas is introduced into the vicinity of the lower portion of an absorption tower 50 through the exhaust gas introducing flow path 101. When there is a shortage of absorbent solution (amine-containing water), the absorbent solution is supplied from the absorbent solution supply tank 51 through the flow path 102 to the vicinity of the lower portion of the absorption tower 50. In addition, the absorbent solution is sprayed from a liquid distributor (not illustrated) in the upper portion of the absorption tower 50 and comes in contact and reacts with carbon dioxide in the exhaust gas rising in the absorption tower 50, and most of the absorbent solution is accumulated as a carbon dioxide-rich solution in the lower portion of the absorption tower 50. The carbon dioxide-rich solution is delivered to the upper portion of the regeneration tower 60 through the flow path 103 in which the heat exchanger 52 is interposed.

From the top of the absorption tower 50, a carbon dioxide-desorbed gas is delivered to the emission control section 53 through the flow path 104. The carbon dioxide-desorbed gas entrains a part of the absorbent solution. For this reason, in the emission control section 53, the carbon dioxide-desorbed gas is washed with washing water in order the absorbent solution component not to be emitted into the environment. The washing water after washing is reused as an absorbent solution as described later, since it contains the absorbent solution component.

The carbon dioxide-rich solution delivered to the upper portion of the regeneration tower 60 is heated by heat of a reboiler 61, and the carbon dioxide-rich solution delivered from the flow path 103 releases carbon dioxide and is regenerated as an absorbent solution. This absorbent solution is accumulated as carbon dioxide-lean solution in the lower portion of the regeneration tower, and is circulated to a liquid distributor of the absorption tower 50 through the flow path 108 cross-connected to the heat exchanger 52, and is used for the absorption of carbon dioxide in the exhaust gas described above. The heat exchanger 52 performs functions of heating a carbon dioxide-rich solution flowing through the flow path 103 by a heated carbon dioxide-lean solution flowing through the flow path 108 and of cooling the carbon dioxide-lean solution per se. Carbon dioxide in the regeneration tower 60 is delivered through the flow path 109 to the gas purification section 62 and purified therein, and then recovered to a carbon dioxide recovery section (not illustrated) through the flow path 110.

The washing water containing the absorbent solution component (amine compound) in the emission control section 53 is, as water to be treated, delivered to and accumulated in the washing water accumulation tank 76.

The water to be treated in the washing water accumulation tank 76 is introduced through the flow path 112 into the water to be treated tank 77, which includes the carbon dioxide introducing unit, and then carbon dioxide is dissolved into the water to be treated. The amine-containing water to be treated, in which carbon dioxide is dissolved, is supplied through the flow path 113 to the first chamber 73 of the osmotic pressure generator 71, which is partitioned by the semipermeable membrane 75. About the time when the water to be treated is supplied, a highly concentrated working medium is supplied from the working medium storage tank 78 through the flow path 115 to the second chamber 74. At this time, an ion molar concentration of the working medium supplied to the second chamber 74 is higher than the concentration of the amine contained in the water to be treated supplied to the first chamber 73. For this reason, an osmotic pressure difference is generated between the water to be treated in the first chamber 73 and the working medium in the second chamber 74, and water contained in the water to be treated passes through the semipermeable membrane 75 and moves to the working medium in the second chamber 74. The water to be treated in the first chamber 73 is concentrated by such movement of the permeated water, and is circulated to the water to be treated tank 77 through the flow path 114. On the other hand, the working medium in the second chamber 74 is diluted by the moved permeated water and discharged to the outside through the flow path 116. When a content of the working medium in the working medium storage tank 78 decreases, a highly concentrated working medium is supplied to the working medium storage tank 78 through the flow path 117.

As described above, in the process in which the amine-containing washing water accumulated in the washing water accumulation tank 76 is used as the water to be treated, and carbon dioxide is introduced into the water to be treated in the water to be treated tank 77 including the carbon dioxide introducing unit, and the water to be treated is supplied to the osmotic pressure generator 71 in order to concentrate the amine, similarly to the description in the first embodiment, the contents of the water and the unwanted amine compound in the water to be treated circulated from the first chamber 73 of the osmotic pressure generator 71 to the washing water accumulation tank 76 are reduced than those in the water to be treated before being introduced into the first chamber 73, while the content of the useful amine compound is maintained. That is, the water to be treated in the first chamber 73 is returned to the water to be treated tank 77 in a concentrated condition in which the content of the useful amine compound is relatively increased. The concentrated water, which is circulated between the water to be treated tank 77 including the carbon dioxide introducing unit and the osmotic pressure generator 71, and in which the useful amine compound contained in the water to be treated is sufficiently concentrated, is returned from the water to be treated tank 77 through a flow path 121 to the washing water accumulation tank 76. The washing water, a part of which is concentrated by the amine-containing water concentration system 70, in the washing water accumulation tank 76 is delivered to the absorbent solution supply tank 51, for example, and reused as an absorbent solution.

Therefore, according to the fifth embodiment, the carbon dioxide-desorbed gas entraining a part of the absorbent solution is delivered from the top of the absorption tower 50 to the emission control section 53, in which the absorbent solution component (amine) is washed with water, and the washing water is not subjected to a drainage treatment so as to be discharged to the outside of the system, but is concentrated and circulated as the water to be treated between the water to be treated tank 77 including the carbon dioxide introducing unit and the osmotic pressure generator 71, and thereby it can be reused as an absorbent solution of the exhaust gas treatment of the absorption tower 50. As a consequence, the drainage treatment facility of the amine-containing washing water can be omitted and at the same time the absorbent solution is reused, hence a highly economical carbon dioxide recovery system can be provided.

Note that, the fifth embodiment is not limited to the embodiment in which the concentrated water to be treated is returned from the water to be treated tank 77 to the washing water accumulation tank 76, and then delivered from the washing water accumulation tank 76 to the absorbent solution supply tank 51. For example, there may be an embodiment in which the concentrated water to be treated is delivered directly from the water to be treated tank 77 to the absorbent solution supply tank 51. Since the concentrated water to be treated is not mixed with unconcentrated washing water in the washing water accumulation tank 76, concentrated water containing a higher concentration of amine can be supplied to the absorbent solution supply tank 51. In addition, there may be an embodiment in which the concentrated water to be treated may be delivered from the washing water accumulation tank 76 to a liquid distributor (not illustrated) in the upper portion of the absorption tower 50 or to the upper portion of the regeneration tower 60 so as to be reused as an absorbent solution.

In the fifth embodiment, similarly to the second embodiment, there may be a pump interposed in the flow path 113 connecting the water to be treated tank 77 including a carbon dioxide introducing unit and the first chamber 73 of the osmotic pressure generator 71, or similarly to the third embodiment, a filtration section may be interposed in the flow path 112 connecting the washing water accumulation tank 76 and the water to be treated tank 77. The maximum discharge pressure of the pump is preferably set to 1 MPa or less.

Sixth Embodiment

A carbon dioxide recovery system according to a sixth embodiment will be described in detail with reference to FIG. 6.

Figure 6:
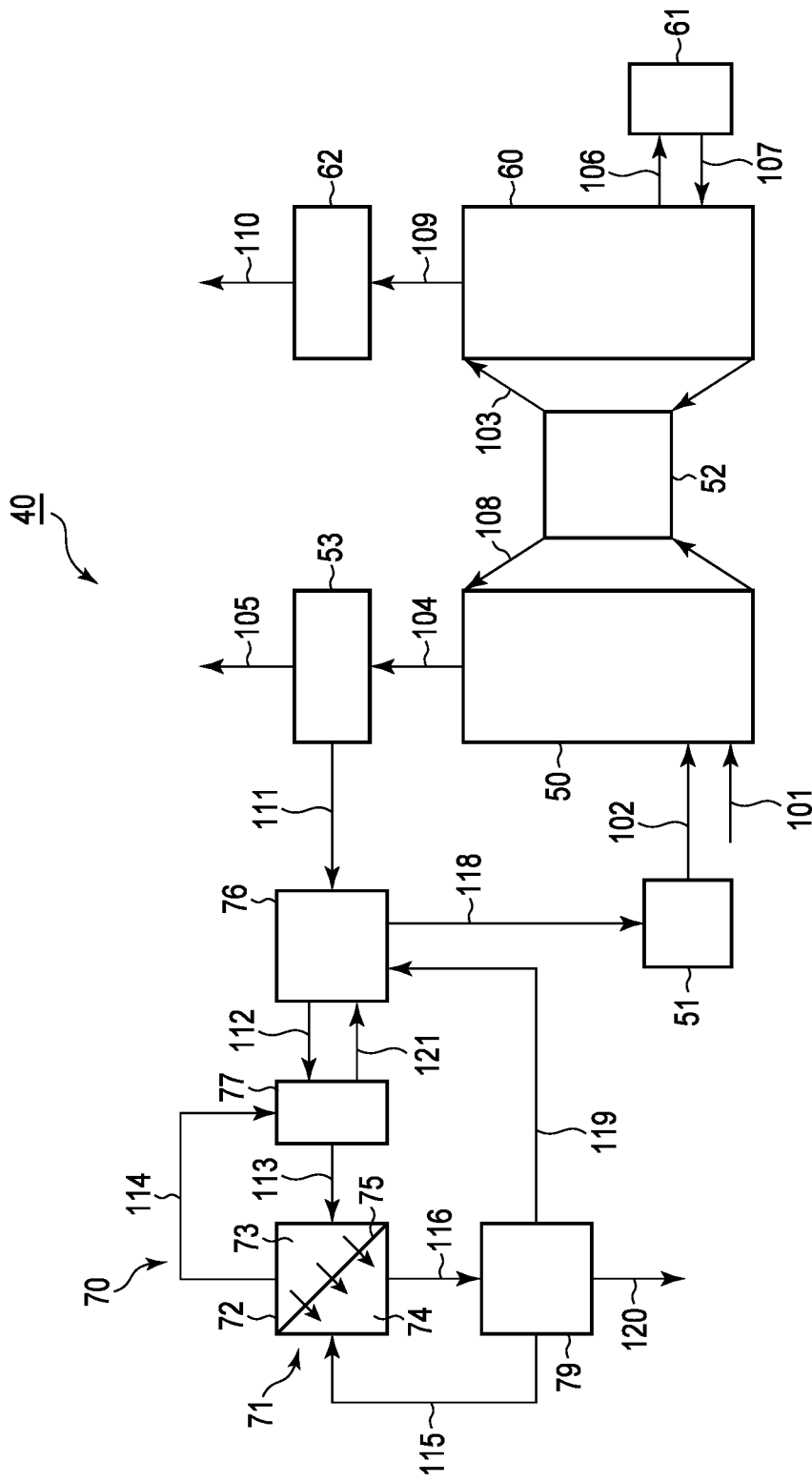
FIG. 6 is a schematic diagram showing a carbon dioxide recovery system of a sixth embodiment.

FIG. 6 is a schematic diagram showing the carbon dioxide recovery system according to the sixth embodiment. In FIG. 6, members similar to those in FIG. 5 described in the fifth embodiment are denoted by the same reference numerals, and description thereof is omitted.

The carbon dioxide recovery system 40 according to the sixth embodiment shown in FIG. 6 includes a working medium regeneration apparatus 79 instead of a working medium storage tank 78. The working medium regeneration apparatus 79 is connected to a second chamber 74 of an osmotic pressure generator 71 by a flow path 115. The second chamber 74 is also connected to the working medium regeneration apparatus 79 by a flow path 116. That is, there is formed a working medium circulation system in which the working medium flows through the working medium regeneration apparatus 79, the flow path 115, the second chamber 74, and the flow path 116, and then returns to the working medium regeneration apparatus 79 again.

In the working medium regeneration apparatus 79, similarly to the regeneration apparatus described in the fourth embodiment, the working medium, which is diluted by the movement of the water passed through a semipermeable membrane 75 from the water to be treated in a first chamber 73, is circulated, and is separated from the water contained in the diluted working medium, so that a highly concentrated working medium is regenerated. Most of the water generated in this water separation process is supplied to a washing water accumulation tank 76 through a flow path 119 and is used as a washing water. A part of the water generated by the working medium regeneration apparatus 79 is discharged to the outside of the system through a flow path 120. The working medium regeneration apparatus 79 is configured to remove the water contained in the diluted working medium with use of a process such as membrane distillation, for example, thereby to regenerate a highly concentrated working medium.

According to the sixth embodiment like this, the working medium is supplied from the working medium regeneration apparatus 79 through the flow path 115 to the second chamber 74 in the working medium circulation system, and thereby the water contained in the water to be treated in the first chamber 73 is allowed to pass through a semipermeable membrane 75, and the working medium diluted by the permeated water is delivered through the flow path 116 to the working medium regeneration apparatus 79, in which the water is removed and a highly concentrated working medium is regenerated. The regenerated working medium is circulated to the second chamber 74 through the flow path 115 and reused.

Therefore, similarly to the fifth embodiment, there can be provide a carbon dioxide recovery system 40, in which drainage treatment facility for the amine-containing washing water can be omitted, and at the same time the amine-containing washing water can be reused as an absorbent solution, furthermore, cost reduction can be realized by the reduction of the usage amount and the waste amount of the working medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An amine-containing water concentration system, which is a system that concentrates water to be treated containing amine compounds, comprising:
   an osmotic pressure generator comprising a treatment vessel, a first chamber to which the water to be treated is supplied, a second chamber storing a working medium, and a semipermeable membrane that partitions the first chamber and the second chamber, which are located in the treatment vessel; and
   a carbon dioxide introducing unit introducing carbon dioxide into the water to be treated,
   wherein the working medium induces forward osmotic pressure,
   the amine compounds include a first amine compound and a second amine compound,
   the first amine compound is more likely to be charged than the second amine compound in the water to be treated into which the carbon dioxide is introduced, and
   the second amine compound is more likely to pass through the semipermeable membrane than the first amine compound in the water to be treated into which the carbon dioxide is introduced.

2. The concentration system according to claim 1, further comprising a pump configured to supply the water to be treated into the first chamber, wherein a maximum discharge pressure of the pump is 1 MPa or less.

3. The concentration system according to claim 1, further comprising a filtration section in a flow path that supplies the water to be treated to the first chamber.

4. The concentration system according to claim 1, wherein the working medium contains at least one selected from the group consisting of an inorganic salt, an amine compound, a saccharide, a polarity inversion compound, and a compound having a lower critical solution temperature.

5. The concentration system according to claim 1, wherein an osmotic pressure of a concentrated water obtained in the first chamber is 800 mOsm or more.

6. A carbon dioxide recovery system comprising:
   the concentration system according to claim 1.

7. The recovery system according to claim 6, wherein the concentration system further comprising a pump configured to supply the water to be treated into the first chamber, wherein a maximum discharge pressure of the pump is 1 MPa or less.

8. The recovery system according to claim 6, wherein the concentration system further comprising a filtration section in a flow path that supplies the water to be treated to the first chamber.

9. The recovery system according to claim 6, wherein the working medium contains at least one selected from the group consisting of an inorganic salt, an amine compound, a saccharide, a polarity inversion compound, and a compound having a lower critical solution temperature.

10. The recovery system according to claim 6, wherein an osmotic pressure of a concentrated water obtained in the first chamber is 800 mOsm or more.

11. The recovery system according to claim 6, further comprising an absorbent solution supply tank, an absorption tower, and a regeneration tower.

12. The recovery system according to claim 11, wherein a concentrated water obtained by the amine-containing water concentration system is supplied to at least one selected from the absorbent solution supply tank, the absorption tower, and the regeneration tower.

13. An amine-containing containing water concentration apparatus, which is an apparatus that concentrates water to be treated containing amine compounds, comprising:
   a treatment vessel;
   an osmotic pressure generator comprising a first chamber to which water to be treated is supplied, a second chamber storing a working medium, and a semipermeable membrane that partitions the first chamber and the second chamber, which are located in the treatment vessel; and
   a carbon dioxide introducing unit introducing carbon dioxide into the water to be treated,
   wherein the working medium induces forward osmotic pressure,
   the amine compounds include a first amine compound and a second amine compound,
   the first amine compound is more likely to be charged than the second amine compound in the water to be treated into which the carbon dioxide is introduced, and
   the second amine compound is more likely to pass through the semipermeable membrane than the first amine compound in the water to be treated into which the carbon dioxide is introduced.

* * * * *